United States Patent Office 3,300,426
Patented Jan. 24, 1967

3,300,426
ADHESIVE COMPOSITION COMPRISING MIXTURE OF A PHENOL-FORMALDEHYDE RESIN AND A POLYBUTADIENE RUBBER LATEX
Eugene R. Hunsucker, Mogadore, Ohio, assignor to The Goodyear Tire & Rubber Company, Akron, Ohio, a corporation of Ohio
No Drawing. Filed Aug. 5, 1963, Ser. No. 300,057
1 Claim. (Cl. 260—29.3)

This invention relates to an improved age-resistant adhesive composition for bonding reinforcing cords to rubber, to reinforcing cords treated with the age-resistant adhesive composition, and to a rubber article reinforced with a cord bonded therein by means of the age-resistant adhesive composition of the present invention.

In the manufacture of rubber articles, including pneumatic tires and mechanical rubber goods, wherein the reinforcing cords are used in combination with the rubber as a means of reinforcing the rubber against various stresses and strains exerted thereon, the cord is first treated with an adhesive composition prior to being embedded in the rubber. After the adhesive composition has been applied to the cord, the cord is heated, in many instances, at extremely high temperatures in order to set the adhesive to the cord. The cord may then be stored under atmospheric conditions for an extended period of time before being embedded in the rubber. It has been observed that conventional adhesive compositions employing synthetic rubber latices, such as conventional diene rubbers including polybutadiene, copolymers of butadiene-1,3 and styrene in combination with a phenol/formaldehyde water-soluble resin, when applied to the cord, are adversely affected by prolonged exposure to the atmosphere in that relatively low adhesion is subsequently developed between the cord and the rubber.

It has been discovered that an all-purpose adhesive composition can be made when at least one-third of the rubber latex content of the adhesive composition of this invention is a cis-1,4 polybutadiene latex containing up to 94% of cis-1,4 polybutadiene, the remaining 6% being trans-1,4 polybutadiene, and the phenol/aldehyde water-soluble resin is preferably made by reacting the components in a mol-to-mol ratio of about 1. The aldehyde may be used in amounts from .5 to 1.5 mols per mol of phenol.

The cis-1,4 polybutadiene latex component of the adhesive may represent all of the hydrocarbon rubber content in the adhesive or be combined with other rubber latices in amount ranging from 1 part to 66 parts of rubber per 100 parts of combined rubber. A suitable rubbery copolymer latex that may be blended with the cis-1,4 polybutadiene diene latex is the vinylpyridine/diene copolymer which is made by reacting a conjugated diene and a vinylpyridine in emulsion using heat and a catalyst, the preferred diene monomer being butadiene-1,3 and the preferred vinylpyridine monomer being 2-vinylpyridine. However, any 1,3 monomer may be used, including isoprene, 2,3-dimethyl-1,3-butadiene, 2-methyl-1,3-butadiene, 1,3-dimethyl-1,3-butadiene, 1,3-pentadiene, 2,4-pentadiene, 3-methyl-2,4-pentadiene, 3,4-dimethyl-2,4-pentadiene, the straight chain, branched chain and cyclohexyl dienes, heptadienes, homologs, analogs, or hydrocarbon-substituted products. Other vinylpyridines include 4-vinylpyridine and various aliphatic vinylpyridines, particularly the alkyl vinylpyridines, such as 2-methyl-6-vinylpyridine, 2-vinyl-5-methylpyridine and 2 - ethyl - 5 - vinylpyridine. These monomers may be copolymerized by any of the conventional methods well-known in the art, such as in bulk without solvents or diluents, in the presence of an inert solvent, or in emulsion. The portions of the monomers initially present in the emulsion to be polymerized may be varied over a wide range. The ratio of diene to vinylpyridine may range from about 95/5 to 20/80, and it is desired to use a ratio in which the diene is present in a predominant amount. The preferred ratio range of diene to vinylpyridine is between about 80/20 and about 40/60. A standard formulation for the preparation of 1,3-butadiene and 2-vinylpyridine comprises 180 parts of water per 100 parts of monomer, 5% of an emulsifier as, for example, sodium stearate, and 0.3% of a catalyst, such as potassium persulfate. In addition to this standard formulation, antioxidants and modifiers may be added.

The prior art has disclosed a number of methods for preparing cis-1,4 polybutadiene. One convenient method has been to polymerize butadiene in a solvent polymerization system such as benzene or toluene employing as a catalyst an aluminum alkyl, such as aluminum triisobutyl, complexed with a halide of a transition metal such as titanium tetra-iodide, wherein the mol ratio of aluminum to titanium varies from about 3:1 to about 6:1.

Other catalyst systems that may be employed in making cis-1,4 polybutadiene involve the use of aluminum alkyl halides, such as aluminum diethyl monochloride, complexed with the transition metal halides of the metals of Group VIII, for instance, cobaltous nickelous chloride, also employing solution polymerization techniques.

Further methods for making cis-1,4 polybutadiene are described in the following patents: French 1,247,307, British 795,730, British 827,365, French 1,148,848, Belgium 573,680, South Africa 592,287, and Belgium 575,671.

The phenol/aldehyde resin that may be used in the adhesive composition of this invention is a water-soluble thermo-settable phenol/formaldehyde condensation product, which is prepared by reacting a phenol with an aldehyde in the presence of an alkaline catalyst. More particularly, the resin may be prepared by reacting 8.9 parts of resorcinol with 6.55 parts of 37% formaldehyde solution in the presence of 5 parts of a 10% sodium hydroxide at 90° C. for 50 minutes in a water bath. The 20% solids adhesive composition may be made by adding the phenol as, for example, resorcinol, to the water and then adding the formaldehyde followed by the addition of sodium hydroxide, after which the rubber latex is then added. The use of sodium hydroxide as the alkali to catalyze the reaction of the phenol with the aldehyde promotes the formation of a water-soluble and thermosettable resin. The sodium hydroxide may be used in amount sufficient to develop a pH in the finished adhesive dip of between 9.0 to 9.5. It is preferred to use the aldehyde in a molecular equivalent; however, less than a mol ratio of aldehyde to phenol of 1:1 may be used and as high as 2 mols of aldehyde per mol of phenol may be used. It is preferred, however, that 1 mol of formaldehyde be reacted with 1 mol of phenol in making the resin component of the adhesive composition of this invention. The resulting reaction mixture may be aged from 1 to 24 hours before application to the cord.

The solids of the resorcinol/formaldehyde/rubber latex composition may range from about 5% to about 30% and preferably from about 20% to about 22%. The total amount of solids deposited on the cord surface when passed through a dip tank containing the adhesive composition may range from about 1.0 to about 8% by weight of the cord and preferably about 5% for a 20% composition. The ratio of resin to rubber latex may range from 1:10 to 2.5:10.

In order to emphasize the advance made over known adhesive compositions, comparative data are disclosed below and these data are based upon identical test conditions. All test specimens were prepared in the same way. For example, all rubbers were cured for 15 minutes at 300° F., unless otherwise noted. All hot U adhesions were made at 250° F., using a sample of rubber 3/16" wide and 3/16" thick with the two legs of a U shaped cord embedded in the 3/16" width part of the rubber on 3/16" centers.

All cords were treated by running the cord into a tank under a roller immersed in the adhesive and out again at a speed of 2 yards per minute under a tension of from 1 to 2 pounds and then dried for 2 minutes at the temperatures indicated. In all instances, the total solids of the adhesive composition ranged from 20 to 22%. The treated cord was subjected to aging conditions at 72° F. by exposing the cord to the atmosphere while hanging from a support.

All adhesives used in the tests were of the same age prior to being applied to the cord. All cords were treated by the single dip system without pretreating the cords in any way.

The rayon cord used in the examples is known as 1100 denier, twisted 2 ply, with a single twist of 13Z per inch and a ply twist of 13S per inch. The nylon cord used in the examples is known as 840 denier/2 ply construction with a single twist of 12Z per inch and a ply twist of 12 per inch.

The polyester fiber is made of the well-known linear polyester obtained by reacting glycols such as ethylene glycol, propylene glycol and the like, with dicarboxylic acids, such as, for example, terephthalic acid, isophthalic acid, stilbenecarboxylic acid and the like. Polyester cords used in the manner disclosed here are also known by the trademark of Vycron, which may be produced in accordance with the disclosure set forth in U.S. Patent 2,965,613, or known by the trademark Dacron, produced in accordance with the disclosure set forth in U.S. Patent 2,465,319.

Other materials which are also difficult to bond to a rubbery composition are synthetic linear polyester-forming polyamides, particularly of the type described in U.S. patents 2,071,250–2,071,253 and 2,130,948, and particularly the aromatic polyamides, and specifically the copolymer or metaphenylene diamine and isophthalic acid. The adhesion of these polyamides to a rubber is greatly increased when treated in accordance with the process of this invention.

All cords are vulcanized in a rubber stock compounded in accordance with the following recipe.

Ingredients: Parts (by weight)
- Natural rubber _____ 100.00
- Zinc oxide _____ 3.00
- Carbon black _____ 50.00
- Stearic acid _____ 2.00
- Pine tar _____ 5.00
- Accelerator (Altax, i.e., benzothiazole disulfide) _____ 1.00
- Sulfur _____ 2.25
- Antioxidant A (a commercial, non-staining antioxidant comprising a mixture of alkylated phenols or styrenated phenols) _____ 1.00

The basic formulation in the preparation of the adhesives used in this application to show the unexpected results developed in the adhesive of this invention is set forth in the following table, all parts being by weight unless otherwise identified.

TABLE I

| Adhesive | A | B | C | D | E |
|---|---|---|---|---|---|
| Resorcinol | 8.9 | 8.9 | 8.9 | 8.9 | 8.9 |
| 37% Formaldehyde | 6.55 | 6.55 | 6.55 | 6.55 | 6.55 |
| 10% NaOH | 5.00 | 5.00 | 5.00 | 5.00 | 5.00 |
| Butadiene/Styrene/Vinylpyridine 70/15/15 terpolymer (39.5% TS) | 35.50 | 35.50 | 35.50 | 35.50 | 35.50 |
| Butadiene/Styrene/70/30 cold copolymer (Pliolite 2108) (40.7% TS) | -------- | 34.20 | -------- | -------- | 64.0 |
| Polybutadiene (Pliolite 2104) (60.5% TS) | -------- | -------- | 23.20 | 43.00 | -------- |
| Cis-1,4 polybutadiene latex (containing 94% cis-1,4 polybutadiene) (43.0% TS) | 65.00 | 33.40 | 33.40 | -------- | -------- |
| Water | 129.10 | 126.45 | 137.45 | 151.05 | 130.05 |

Each of the adhesives A through E set forth in Table I above was made up in a 20% solids dispersion and a rayon cord passed through a dip tank containing one of the adhesives. The cords were dried at 320° F., and then tested for hot U adhesion after exposure of the cords to the atmosphere for from 0 to 14 days. The results of these tests are indicated in the following table.

TABLE II

| Adhesive | A | B | C | D | E |
|---|---|---|---|---|---|
| Days: | | | | | |
| 0 | 18.1 | 20.8 | 20.2 | 20.4 | 20.6 |
| 1 | 19.0 | 16.7 | 17.6 | 14.0 | 13.4 |
| 2 | 20.3 | 19.2 | 18.6 | 14.8 | 14.1 |
| 3 | 24.8 | 21.6 | 18.0 | 14.1 | 13.1 |
| 4 | 17.9 | 21.6 | 20.6 | 13.3 | 12.0 |
| 7 | 24.8 | 21.4 | 20.8 | 11.6 | 12.5 |
| 8 | 21.3 | 18.7 | 21.6 | 14.0 | 11.4 |
| 9 | 20.3 | 19.5 | 19.8 | 14.0 | 12.3 |
| 10 | 22.4 | 21.3 | 19.9 | 14.6 | 11.6 |
| 11 | 22.4 | 21.6 | 21.2 | 14.9 | 9.7 |
| 14 | 21.4 | 21.9 | 18.7 | 13.6 | 11.2 |

In the table above, it is to be observed that adhesives A, B and C, each containing a cis-1,4 polybutadiene latex, were not adversely affected by aging, as indicated by the values obtained, in contrast to adhesives D and E, where no cis-1,4 polybutadiene latex was used.

The same tests were repeated in the manner described above with the exception that nylon cord was substituted for rayon cord. The hot U adhesion values are set forth in the table below.

TABLE III
[Nylon cord processed at 360° F.]

| Adhesive | A | B | C | D | E |
|---|---|---|---|---|---|
| Days: | | | | | |
| 0 | 19.3 | 17.3 | 21.3 | 17.0 | 15.0 |
| 4 | 22.4 | 16.4 | 19.6 | 12.3 | 11.4 |
| 5 | 17.7 | 13.3 | 19.6 | 13.8 | 11.5 |
| 6 | 17.7 | 15.0 | 17.8 | 12.1 | 8.0 |
| 7 | 17.2 | 14.5 | 18.4 | 12.0 | 9.5 |
| 8 | 16.2 | 14.2 | 19.6 | 12.1 | 9.8 |
| 11 | 17.7 | 13.7 | 17.0 | -------- | -------- |
| 12 | 16.2 | 15.0 | 18.1 | -------- | -------- |
| 13 | 15.9 | 12.8 | 19.0 | -------- | -------- |

While certain representative embodiments and details have been shown for the purpose of illustrating the invention, it will be apparent to those skilled in this art that various changes and modifications may be made therein without departing from the spirit or scope of the invention.

What is claimed is:

An adhesive composition comprising a water-soluble heat-convertible resinous reaction product of formaldehyde and a phenol selected from the group consisting of phenol and resorcinol, the mol ratio of the phenol to formaldehyde ranging from 1:0.5 to 1:1.5, and a polybutadiene rubber latex, the polybutadiene rubber latex is of a cis-1,4 configuration in an amount of about 94%, the ratio of resinous reaction product to polybutadiene rubber latex being 1:10 to 2.5:10.

References Cited by the Examiner

UNITED STATES PATENTS

| | | | |
|---|---|---|---|
| 2,615,826 | 10/1952 | Mallory et al. | 260—845 |
| 2,652,353 | 9/1953 | Wilson | 260—29.3 |
| 3,194,294 | 7/1965 | Van Gils | 260—29.3 |
| 3,226,276 | 12/1965 | Rye et al. | 60—29.3 |

MURRAY TILLMAN, *Primary Examiner.*

SAMUEL H. BLECH, *Examiner.*

J. C. BLEUTGE, *Assistant Examiner.*